(12) United States Patent
Eberheim et al.

(10) Patent No.: US 10,416,684 B2
(45) Date of Patent: Sep. 17, 2019

(54) AIRBORNE VEHICLE RECOVERY

(71) Applicant: Worcester Polytechnic Institute, Worcester, MA (US)

(72) Inventors: Richard T. Eberheim, Worcester, MA (US); Nicholas F. Hassan, Worcester, MA (US); Joshua C. O'Connor, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 15/492,161

(22) Filed: Apr. 20, 2017

(65) Prior Publication Data

US 2017/0308104 A1    Oct. 26, 2017

Related U.S. Application Data

(60) Provisional application No. 62/325,087, filed on Apr. 20, 2016.

(51) Int. Cl.
*G05D 1/10*         (2006.01)
*B64B 1/46*         (2006.01)
(Continued)

(52) U.S. Cl.
CPC .............. *G05D 1/105* (2013.01); *B64B 1/46* (2013.01); *B64C 19/00* (2013.01); *B64C 31/02* (2013.01);
(Continued)

(58) Field of Classification Search
USPC ........................................................ 701/14
See application file for complete search history.

(56) References Cited

U.S. PATENT DOCUMENTS 1,784,954 A * 12/1930 Alvistur ................... B64D 5/00
                                                      244/16
3,301,511 A *  1/1967 Webb ..................... B64C 31/032
                                                      244/138 R
(Continued)

FOREIGN PATENT DOCUMENTS

CN       104192295 A     10/2014
RU         87994 U1      10/2009

OTHER PUBLICATIONS

International Search Report, PCT/US2017/028501, dated Aug. 17, 2017, pp. 3.

*Primary Examiner* — Jean Paul Cass
(74) *Attorney, Agent, or Firm* — Armis IP Law, LLC (57) ABSTRACT

The airborne vehicle recovery method and apparatus enables radiosonde users to reliably recover launched radiosondes and provides new and unique opportunities for research and data acquisition with balloon launched radiosondes. Airborne vehicles such as radiosondes are disposed in a flight body adapted for propulsionless, gliding navigation for returning to one of several designated landing sites for recovery. Onboard electronics including a navigation computer, flight computer, and lightweight battery are employed for selecting a landing site, computing a heading and direction, and actuating flaps for pursuing a propulsionless, gliding path to the landing site. Gliding is directed only by right and left flaps responsive to respective actuators, such that the inclusion of only the actuators, navigation and flight electronics, and without active propulsion, enables sufficient gliding range from the lightweight construction and arrangement to reach one of several landing sites for effecting substantial recovery rates of the radiosondes.

4 Claims, 7 Drawing Sheets

(51) Int. Cl.
  *B64C 31/02* (2006.01)
  *B64C 39/02* (2006.01)
  *B64D 45/04* (2006.01)
  *G05D 1/06* (2006.01)
  *B64C 19/00* (2006.01)

(52) U.S. Cl.
  CPC ............ *B64C 39/024* (2013.01); *B64D 45/04* (2013.01); *G05D 1/0676* (2013.01); *B64C 2201/021* (2013.01); *B64C 2201/088* (2013.01); *B64C 2201/101* (2013.01); *B64C 2201/104* (2013.01); *B64C 2201/125* (2013.01); *B64C 2201/146* (2013.01)

(56) References Cited

U.S. PATENT DOCUMENTS

| | | | |
|---|---|---|---|
| 4,422,147 A * | 12/1983 | Hanke | G05D 1/063 244/182 |
| 5,186,418 A * | 2/1993 | Lauritsen | B64D 1/00 102/387 |
| 6,154,693 A * | 11/2000 | Aberschitz | G01S 5/0054 701/120 |
| 6,343,244 B1 | 1/2002 | Fuji et al. | |
| 9,688,403 B2 * | 6/2017 | Winn | B64C 39/024 |
| 9,791,866 B2 * | 10/2017 | Paduano | G05D 1/042 |
| 9,817,396 B1 * | 11/2017 | Takayama | G05D 1/0038 |
| 2005/0216141 A1 * | 9/2005 | Phillips | B64C 3/10 701/7 |
| 2008/0149779 A1 * | 6/2008 | Phillips | B64C 3/52 244/201 |
| 2009/0152391 A1 * | 6/2009 | McWhirk | B64B 1/02 244/30 |
| 2014/0319267 A1 | 10/2014 | Paranjape et al. | |
| 2015/0323932 A1 * | 11/2015 | Paduano | G05D 1/042 701/3 |
| 2015/0336671 A1 * | 11/2015 | Winn | B64C 39/024 701/3 |
| 2016/0327945 A1 * | 11/2016 | Davidson | G05D 1/0027 |
| 2017/0069214 A1 * | 3/2017 | Dupray | G08G 5/0021 |
| 2017/0106986 A1 * | 4/2017 | Sweeny | B64C 25/58 |
| 2017/0259917 A1 * | 9/2017 | Winn | B64C 39/024 |
| 2017/0308104 A1 * | 10/2017 | Eberheim | B64B 1/46 |
| 2018/0012504 A1 * | 1/2018 | van Cruyningen | G08G 5/0069 |
| 2018/0045854 A1 * | 2/2018 | Kneuper | G01W 1/10 |

* cited by examiner

AIRBORNE VEHICLE RECOVERY

RELATED APPLICATIONS

This application claims the benefit under 35 U.S.C. § 119(e) of U.S. Provisional Patent Application No. 62/325,087, filed Apr. 20, 2016, entitled "RECOVERY OF RADIOSONDE AIRCRAFT," incorporated herein by reference in entirety.

BACKGROUND

Every year, the U.S. National Weather Service (NWS) launches over 70,000 weather balloons to study the atmosphere. These balloons provide the most cost effective way of recording important atmospheric data up to the very edge of Earth's atmosphere. Each balloon carries an instrumentation package called a radiosonde.

Radiosondes weigh between 250 and 500 grams and transmit data such as GPS location (for winds aloft), temperature, humidity, and pressure back to a ground station for the duration of the flight. Radiosondes used by the National Weather Service are the most common models; they ascend by balloon at a rate of 1000 feet per minute and transmit the data they collect using 300 milliwatt or less transmitters on the 400 MHz meteorological band. Once the balloon bursts, the radiosonde falls back to earth with a small parachute designed to prevent it from hitting the ground hard enough to harm people or property.

Unfortunately, of the 70,000+ weather balloon launches per year, less than 20% of the radiosondes are recovered. While radiosondes are usually physically capable of reuse, the issue lies in the lack of a cohesive recovery effort. The only means for radiosonde recovery is to be found by a passer-by who sends it back to the NWS using the mailer included with every unit. At a cost of roughly $290 per unit, the annual cost of lost radiosondes is substantial.

SUMMARY

An airborne vehicle recovery method and apparatus enables radiosonde users to reliably recover launched radiosondes, as well as providing new and unique opportunities for research and data acquisition with balloon launched radiosondes. Airborne vehicles such as radiosondes are disposed in a flight body adapted for propulsionless, gliding navigation for returning to one of several designated landing sites for recovery. Onboard electronics including a navigation computer, flight computer, and lightweight battery are employed for selecting a landing site, computing a heading and direction, and actuating control surfaces such as flaps for pursuing a propulsionless, gliding path to the landing site. Gliding is directed only by right and left control surfaces responsive to respective actuators, such that the inclusion of only the actuators, navigation and flight electronics, and without active propulsion, enables sufficient gliding range from the lightweight construction and arrangement to reach one of a manageable number of landing sites for effecting substantial recovery rates of the radiosondes.

Configurations herein are based, in part, on the observation that scientifically purposed airborne vehicles such as radiosondes provide valuable scientific data for atmospheric and weather research and forecasting. Radiosondes are small electronic appliances adapted to be tethered to high altitudes for data gathering. Radiosondes weigh between 250 and 500 grams and transmit data such as GPS location (for winds aloft), temperature, humidity, and pressure back to a ground station for the duration of the flight. Radiosondes used by the National Weather Service are the most common models; they ascend by balloon at a rate of 1000 feet per minute and transmit the data they collect using 300 milliwatt or less transmitters on the 400 MHz meteorological band. Once the balloon bursts, the radiosonde falls back to earth with a small parachute designed to prevent it from hitting the ground hard enough to harm people or property.

Unfortunately, conventional radiosondes suffer from a shortcoming of vehicle loss due to low recoverability. Configurations here substantially overcome the problem of radiosonde recovery by incorporating the radiosonde into a small UAV (Unmanned Aerial Vehicle) capable of autonomously selecting and flying to a safe location after disconnecting from the balloon at apogee. This greatly increases the recovery rate of radiosondes and will reduce the pollution that results from their use.

Particular configurations herein depict a method for propulsionless return of an airborne probe, including ascending a flight body including radiosonde capability to a data gathering altitude, such as via a weather balloon, and detecting a free fall state of the flight body upon release from the balloon. The device computes a heading and a distance to a predetermined landing site, and actuating a plurality of planar surfaces on opposed sides of the flight body for effecting airflow above and below the planar surfaces for propulsionless direction of the flight body to the predetermined landing site resulting from a gliding movement of the flight body.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations below depict an example implementation of the propulsionless flight device as disclosed herein. While the example arrangement depicts a radiosonde vehicle adapted for data gathering and scientific observation, alternative approaches may employ the disclosed approach for various applications, such as geographical, reconnaissance, search/rescue of remote areas, tactical and other implementations.

Figure 1:
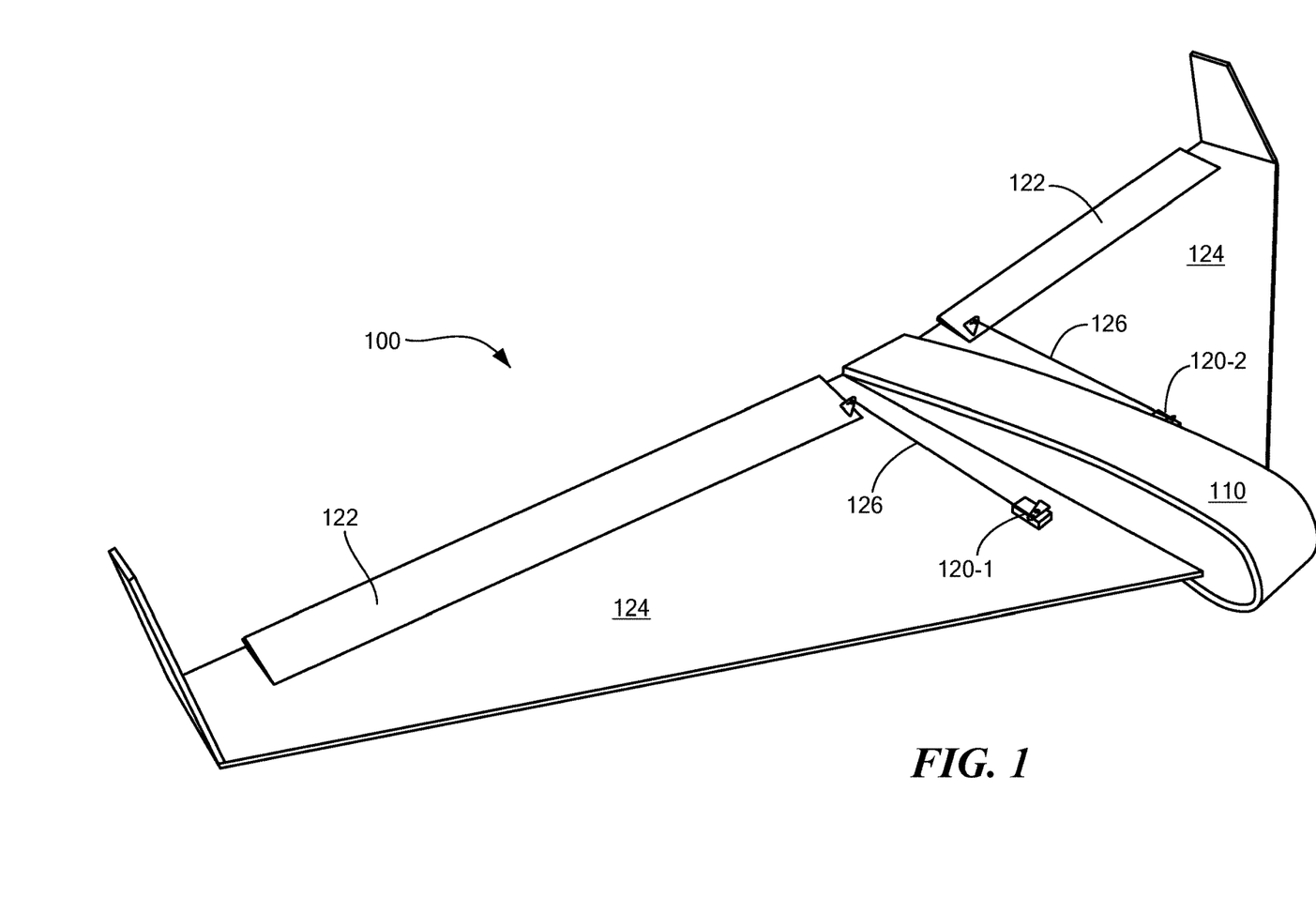
FIG. 1 is a perspective view of a radiosonde flight device suitable for use with configurations herein.

In the configurations disclosed below, FIG. 1 is a perspective view of a radiosonde flight device suitable for use with configurations herein. The propulsionless flight device 100 includes a flight body 110 having an aerodynamic response to an airflow generated in response to a free fall following a weather balloon driven ascent. A plurality of actuators 120-1, 120-2 (120 generally), typically one on each wing, are operable for directing control surfaces 122, such as flaps, in the airflow on opposed sides of the flight body 110 for effecting airflow above and below the flaps. Electronics in the flight body 110 include navigation logic for determining a distance and a heading to a predetermined landing site. The actuators 120 are responsive to the navigation logic for directing the flight body 110 to the predetermined landing site based on airflow resulting from a gliding movement of the flight body 110. The flight body 110 employs wings 124 defined by elongated planar surfaces extending from opposed sides of the flight body 110, such that the control surfaces 122 attach to the wings 124. The navigation logic is configured to direct the actuators 120 for attaining the predetermined landing site in an absence of active propulsion. The actuators 120 extend and retract control rods 126 connected to the respective control surfaces 122. The control surfaces 122 may be any suitable aerodynamic structure responsive to the actuators 120 for directing a flight path. The control surfaces 122, or flaps, may be curved or extendable, or may be substantially flat or planar, and collectively form an aerodynamically responsive region along with the corresponding wing for manipulating the flight path of the flight body as disclosed herein. Further, other suitable aerodynamic controls may be employed, such as servo motors, pneumatic or hydraulic actuation may be employed. Generally, the navigation logic maintains airflow across the planar surfaces by gliding momentum driven by a gravitational descent.

In the example configuration disclosed, the actuators 120 further comprise a first actuator 120-1 for controlling a right flap 122 and a second actuator 120-2 for controlling a left flap 122, such that the right flap and left flap are operative to steer the flight body 110 to the predetermined landing site by independent control from the navigation logic for gliding according to a heading (direction) and distance, discussed further below.

The example configuration employs a battery connected to the actuators for powering the actuators, such that the battery has an electrical capacity for powering the actuators to the predetermined landing site (in addition to the flight, navigation and data gathering computing functions), and a weight for permitting propulsionless gliding operation of the flight body. The battery may be of a high-density chemistry, such as a lithium (Li) ion or other suitable chemistry and capacity for powering the actuators a sufficient distance to reach a landing site. In an expected flight scenario, a return flight is expected to cover up to several hundred miles at a glide slope of around 7-8 to 1. The battery is also expected to encounter ambient temperatures down to −40° F.

Figures 2A, 2B:
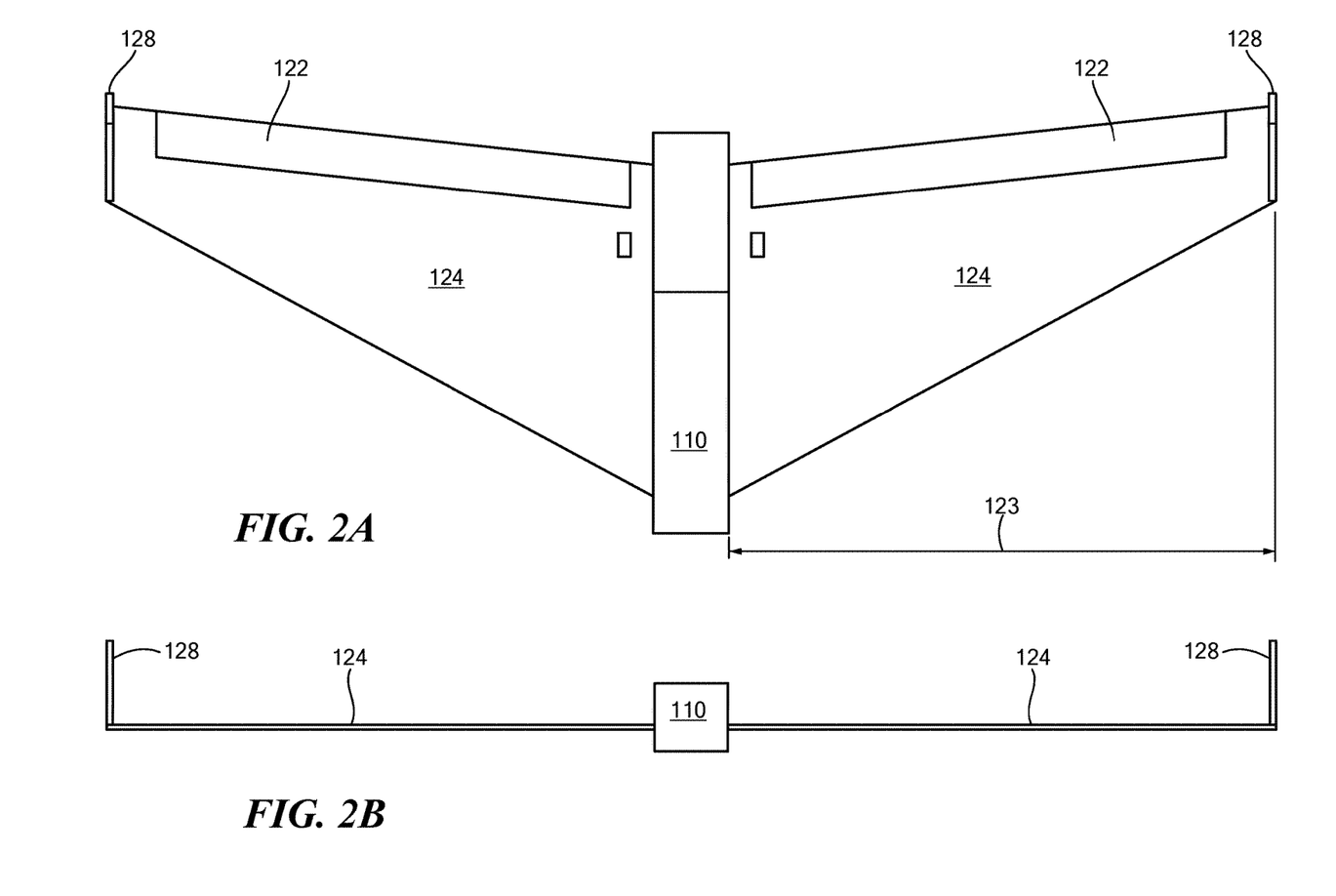
FIGS. 2A-2C are plan, front elevation and side elevation views of the flight device of FIG. 1.
Figure 2C:
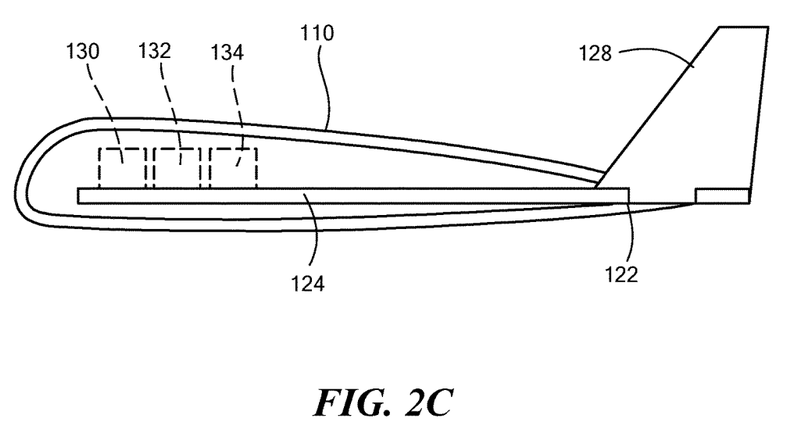

FIGS. 2A-2C are plan, front elevation and side elevation views of the flight device of FIG. 1. Referring to FIGS. 1-2C, the example flight body 110 is defined by a flying wing shape, such that the flying wing has a central body elongated in the direction of travel, and wings 124 that extend in opposed (right and left) directions from the sides of the central body. The planar surfaces taper backward to a narrow width, angled back from the direction of travel, such that the actuator directed control surfaces, 122, are coupled on a rearward side of the wing 124 and extend along a length 123 of each wing 124. Vertically extending stabilizers 128 provide aerodynamic stability and integrity.

The flight body 110 houses the electronics for data gathering and control, including a navigation computer 130, flight control computer 132, and data gathering computer 134 for radiosonde operations. These computer arrangements may be integrated in any suitable arrangement, such as incorporating the data gathering computer 134 into the navigation computer 130 for utilizing gathered weather data for descent, discussed further below.

Figure 3:
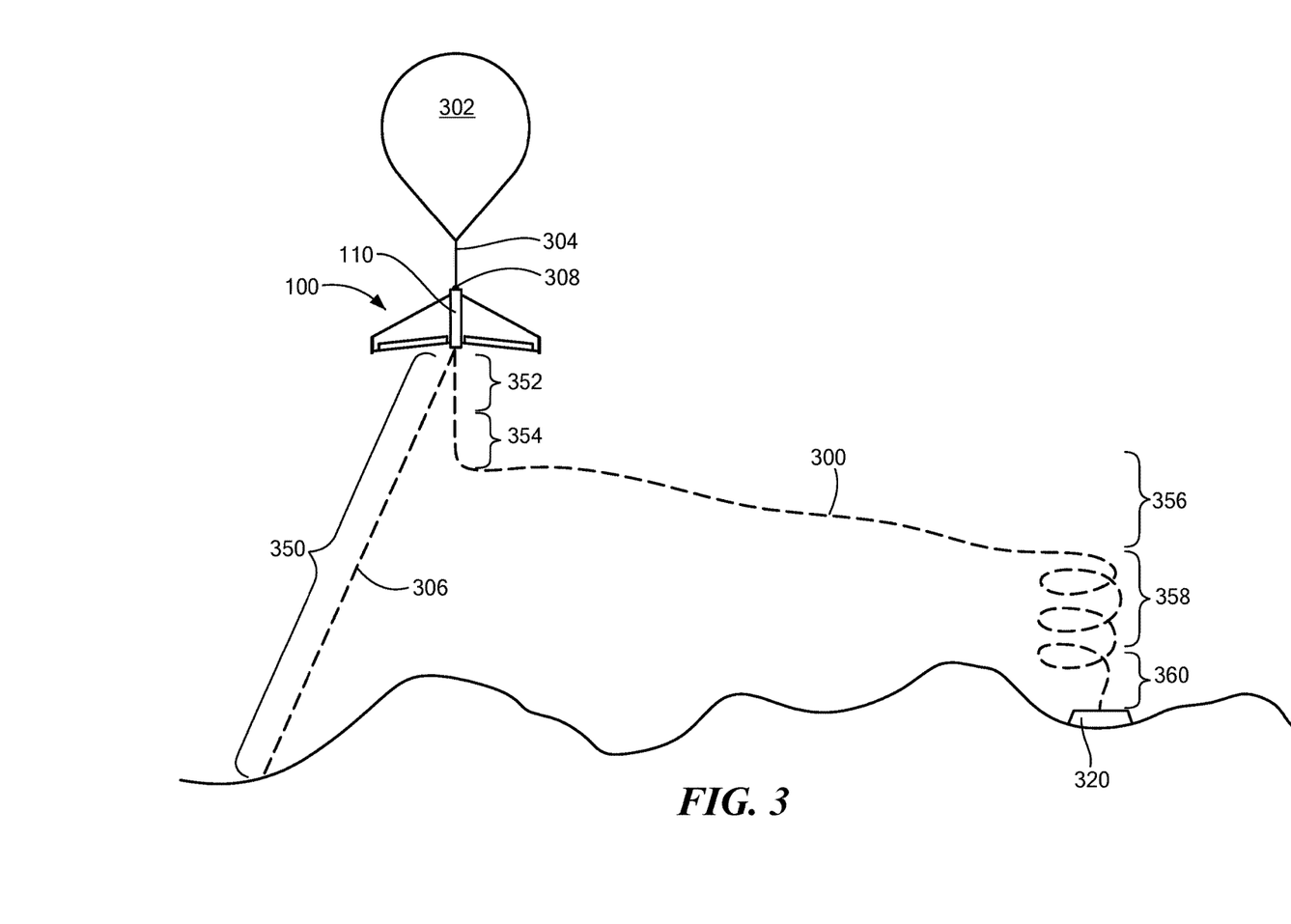
FIG. 3 shows a path of the flight device of FIG. 1 in use according to configurations herein.

FIG. 3 shows a path of the flight device of FIG. 1 in use according to configurations herein. The radiosonde operations are encapsulated in the electronics for providing the navigation and flight operations, encapsulating the return flight capabilities and radiosonde data gathering capabilities in an integrated flight body 110. A weather balloon 302 or other ascending vehicle ascends the flight body 110 from controlled attachment via a tether 304. An altitude indication (altimeter, GPS, or other suitable measurement) detects when the flight body 110 attains an altitude sufficient for completion of data gathering. A third actuator (two are employed for flap control) disengages the flight body 110 from the ascending vehicle by releasing the controlled attachment tethering the flight body 110, such as from releasing a loop 308, hook, pin or similar attachment.

The navigation computer 130 includes instruction for navigating flight paths to available landing sites, and a set of the available landing sites based on an initial launch point of the weather balloon 302. Prior to release, the navigation computer 130 computes the predetermined landing site 320 identifying, in a memory, the available landing sites, and computing, from the available landing sites, attainable landing sites based on an altitude, distance, and altitude layers having high winds. Available landing sites may be loaded based on those within a certain maximum range or that may be reached under optimal conditions. The navigation computer computes the predetermined landing site 320 based on which of the attainable landing sites is unlikely to be affected by the high wind layers, discussed further below in FIG. 4. Generally, landing sites in the direction of prevailing winds are favored, however different wind patterns or regions at intermediate altitudes, or layers may be considered.

Based on the predetermined landing site, the flight computer 132, in communication with the navigation computer 130, receives a heading and a distance, and directs the actuators to attain the predetermined landing site 320 based on several sensors and subsystems. The flight computer 132 maintains the specified heading (direction) and distance by receiving position information from a GPS (Global Positioning System), receiving speed information from a pitot tube, and receiving angular information from an IMU (Inertial Measurement Unit). From the sensory input and computations, the flight computer 132 invokes the actuators 120 for controlling each of the control surfaces 122 for gliding to the predetermined landing site 320 resulting from propulsionless movement responsive to the actuated planar surfaces (control surfaces 122).

Continuing to refer to FIG. 3, in greater detail, the return flight path 300 undergoes several phases for attaining the predetermined landing site 320. An initial ascent path 306 is vertical or substantially vertical during a balloon launch phase 350. The tethered device 100 is drawn upward by the weather balloon 302 attached by tether 304. Any suitable ascent vehicle may be employed, in addition to the example context using a weather balloon ascended radiosonde device 100 in a data gathering mode. In general, the navigation computer 130 computes a heading and a distance to a predetermined landing site 320, and the flight computer 132 actuates a plurality of planar surfaces, such as control surfaces 122, on opposed sides of the flight body 110 for effecting airflow above and below the planar surfaces for directing the flight body to the predetermined landing site 320 resulting from a gliding movement of the flight body 110.

Upon attaining a sufficient altitude for completing a data gathering operation, meaning the altitude for radiosonde operations are sufficient, the navigation computer 130 detecting a free fall based on a downward travel direction. During the free fall phase 352, the IMU, GPS and/or altimeter detects that the flight body 110 is no longer ascending. Next, the flight computer 132 detects a minimum flight speed during a downward acceleration phase 354, generally from a pitot tube. Minimum flight speed is substantially around 25 mph. Once flight speed is attained, a controlled descent phase 356 is initiated, in which the flight computer 132 invokes the planar surfaces for maintaining a controlled descent toward the predetermined site 320. The controlled descent 356 covers most of the lateral distance to the landing site 320, until the navigation computer 130, via GPS locating, determines that the flight body 110 is substantially above the landing site 320. The navigation computer 130 performs a stationary descent phase 358 once above the predetermined site by a cyclic iteration of travel direction, such as by spiraling downward. The navigation computer 130 initiates a safe flight mode 360 after gliding within a modest altitude above the ground at the predetermined landing site 320. Upon attaining the landing site 320, the device 100 enters a safe flight mode where it is in a "continuous stall" until touchdown. This flight mode is inherently safe, and is such that it cannot cause injury when executed from any altitude (the flight body has a limited weight), and defines a safety feature in the event that the flight systems suffer a failure as well as being used in the landing sequence. The predetermined landing site 320 is presumed to be a location from which multiple radiosondes may return for subsequent reuse.

Figure 4:
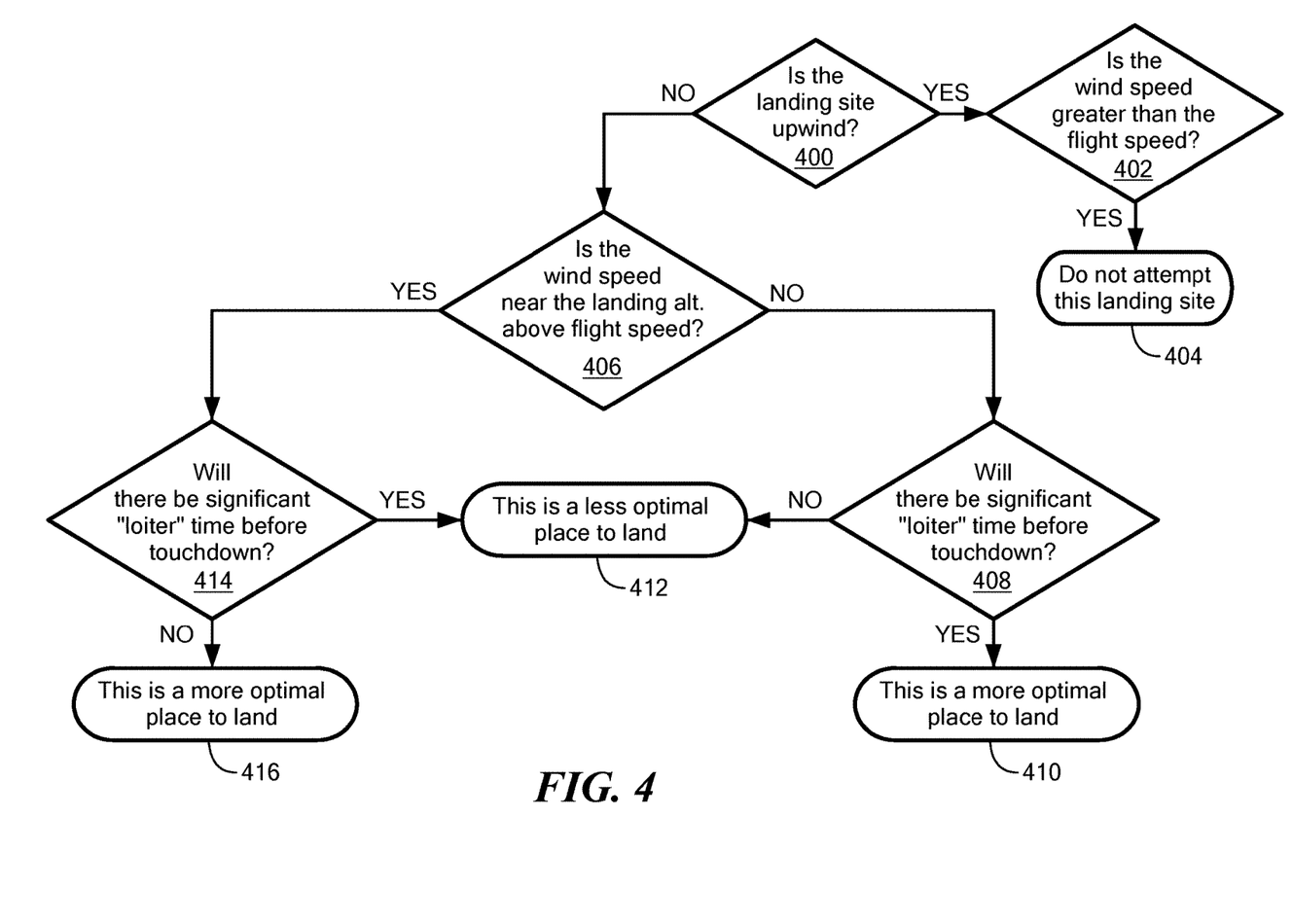
FIG. 4 is a flowchart of the landing site determination logic used in the path of FIG. 3.

FIG. 4 is a flowchart of the landing site determination logic used in the path of FIG. 3. Based on wind data gathered during the ascent, the navigation computer 130 selects the landing site 320 based on "pockets" or layers of high wind, in addition to ambient wind at detachment from the balloon 302. At step 400, an initial check determines if a proposed landing site is upwind. If so, then if the wind speed is greater than flight speed (around 25 mph) at step 402, a determination to dismiss this landing site occurs at step 404.

For a downwind landing site, a check is made to identify if wind speed near the landing site is above flight speed, as shown at step 406. A check at step 408 determines if there is significant "loiter" time, such as a stationary descent phase 358 over the landing site. If so, this points towards a more optimal place to land, as shown at step 410, as there is ample controlled flight time. If there would not be much loiter time, the landing site 412 is passed on, as there may not be sufficient time to reach the landing site if conditions change.

If, in contrast, there is a high wind at an attainable landing site, then the check for loiter time shifts, as shown at step 414. If the flight body 110 is facing a stronger wind near touchdown, it is beneficial to minimize loiter (circling) time before touchdown. This is to reduce the chance of being blown off course, as shown at step 416. Otherwise, a longer descent time is disfavored, as shown at step 412. This wind speed information is factored into the decision made by the navigation computer 130 as to which of the preloaded landing sites is the best choice. These considerations depict an example logic implementation for landing site 320 identification. Other considerations may be employed in alternate configurations.

Figure 5:
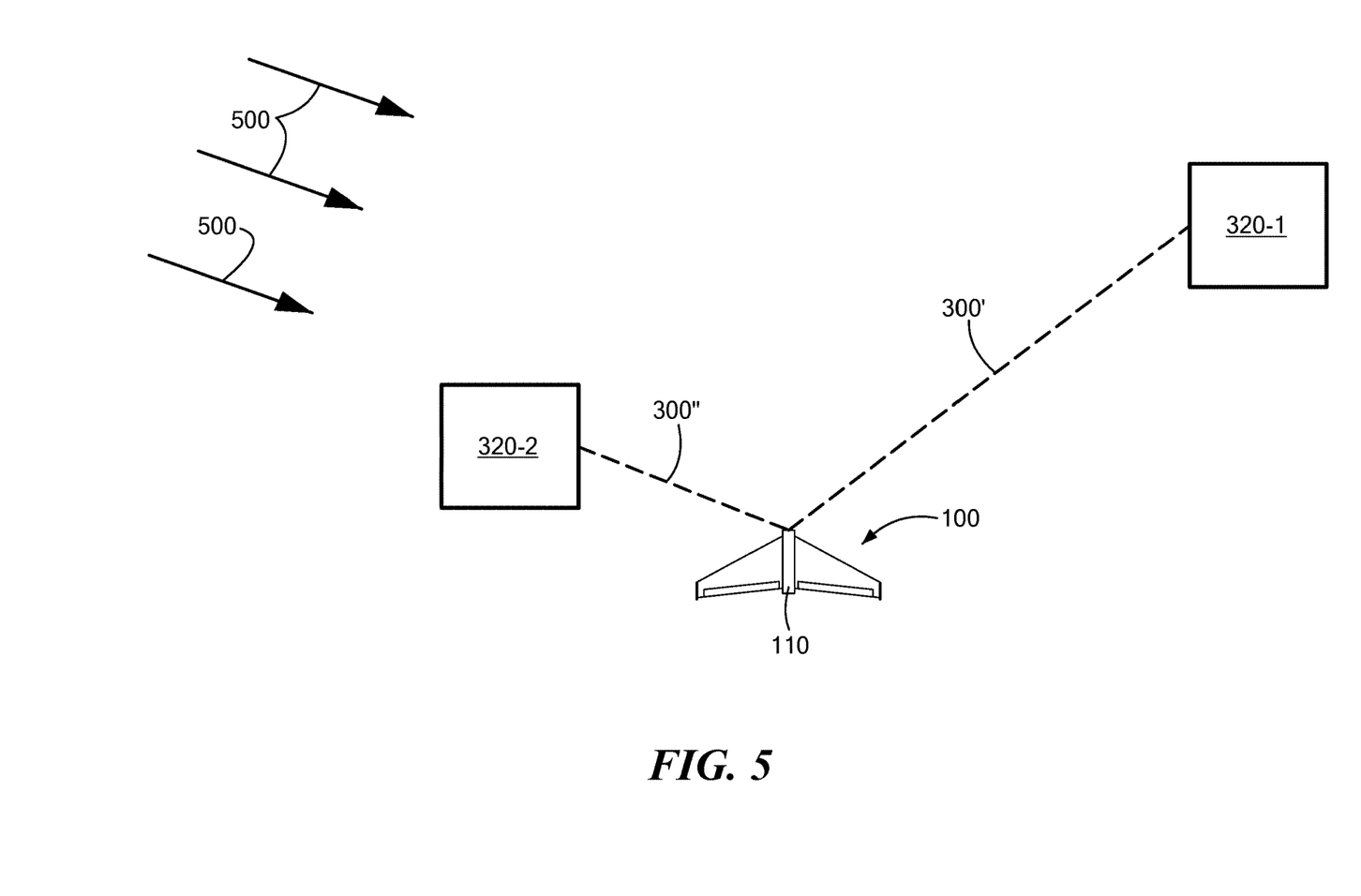
FIG. 5 shows geographical considerations in selection of the landing site in FIG. 4.

FIG. 5 shows geographical considerations in selection of the landing site in FIG. 4. Referring to FIGS. 1-5, the flight computer 30 identifies attainable landing sites 320-1, 320-1 from among the available landing sites that are preprogrammed into the navigation computer 130. The navigation computer 130 computes, based on wind currents 500 identified during the ascent, an attainable landing site 320 having a greatest likelihood of being reached. In FIG. 5 the wind currents 500 are more aligned with a flight path 300' to landing site 320-1. A flight path 300" to landing site 320-2 is substantially upwind from wind currents 500, thus navigation computer would direct the flight body 110 to the landing site 320-1.

Figure 6:
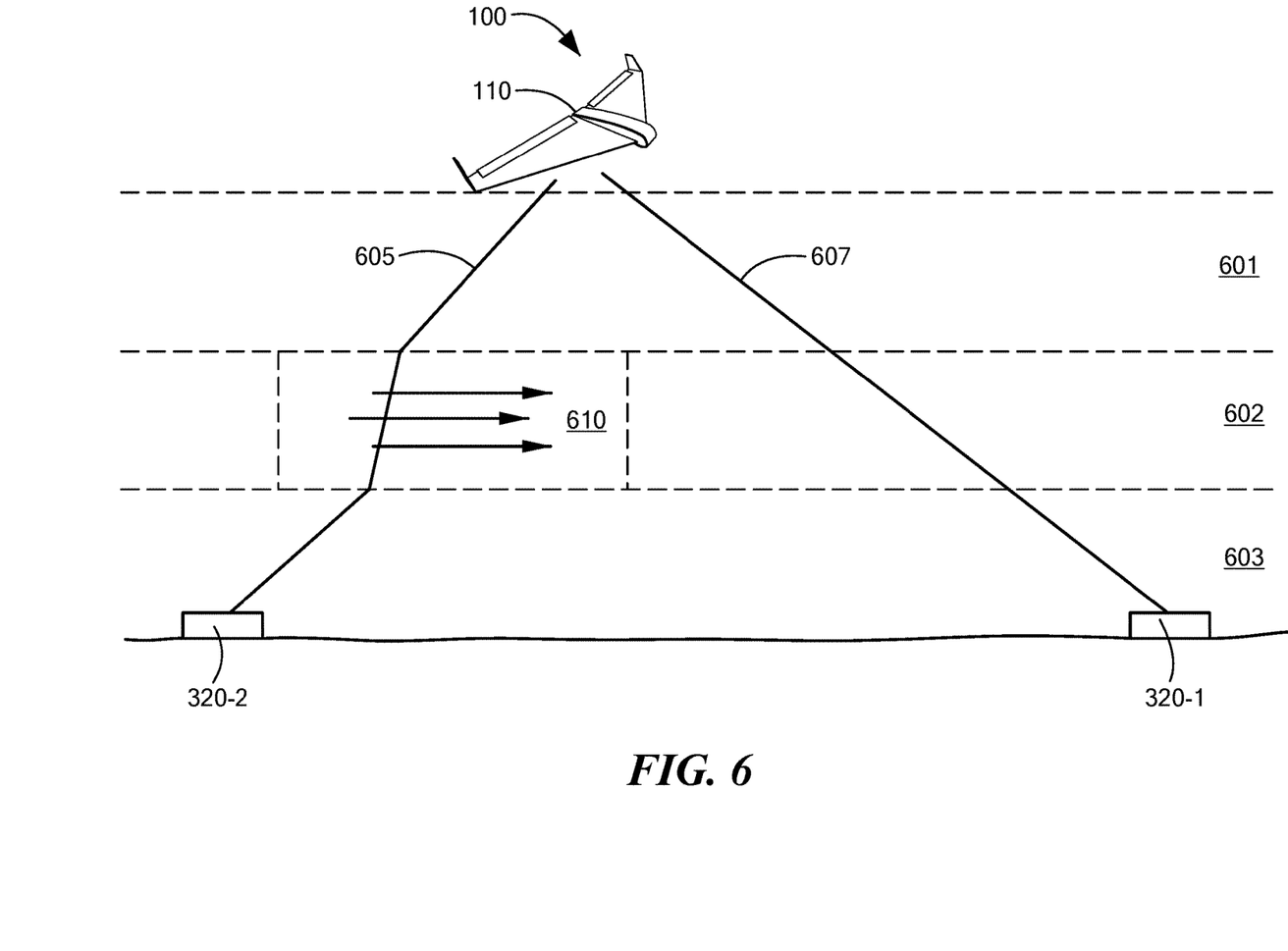
FIG. 6 shows altitude considerations in selection of the landing site in FIG. 4.

FIG. 6 shows altitude considerations in selection of the landing site in FIG. 4. During the ascent, in addition to any other radiosonde data gathering activities occurring, the navigation computer 130 identifies altitudes having strong winds during the ascent, and labels ranges of altitudes having the high winds as layers and regions or areas. FIG. 6 shows 3 layers 601, 602 and 603, in which layer 602 contains a region 610 of high winds. The navigation computer 130 is operable to perform an accelerated descent thorough the layers 602 of high winds by increasing an angle of descent, as shown by flight path 605, thus accelerating the flight speed to quickly pass without deviation from the navigated direction. The navigation computer 130 then resumes the controlled descent upon traversing the high wind layer 610. Alternatively, a flight path 607 may be selected as avoiding high wind regions 610 or aligned with prevailing wind, even though the lateral distance of the flight path is greater 607, as long as the flight path was computed as attainable based on the achievable glide slope.

The navigation computer 130, therefore, identifies the available landing sites and determining the attainable landing sites based on an altitude, distance, and layers of altitude having high winds. The navigation computer 130 computes the predetermined landing site based on which of the attainable landing sites is unlikely to be affected by the high wind layers.

Navigation logic is provided by both the navigation computer 130 and the flight computer 132. The navigation computer 130 computes the landing site 320, and a distance and a heading based on the site 320, and the flight computer directs the actuators for maintaining descent and heading. In the example configuration, the flight computer 132 controls the actuators 120 based on a rolling min/max filter over a detected airspeed for avoiding redundant, cyclic descent path adjustments, or "porpoising" over a sinusoidal type of path resulting from excessive flap movement. The rolling min/max filter employs a derivative of the detected airspeed, and utilizes a relative few number of recent data points. The lightweight, gliding nature of the flight body 110 tends to elude conventional aerodynamic computations that may be effective on heavier, more inertial, conventional aircraft.

The logic represented by the navigation computer 130, flight computer 132 and data gathering computer 134 represent an integrated package of size and weight considerations for ensuring effective gliding operation. A number of design choices and considerations made their way into the final flight controller. In general, every component selected for this design is rated to operate down to at least −40° C. in order to handle the extreme conditions of the upper atmosphere. This includes the selection of capacitors used, as we had to avoid the use of electrolytic capacitors since their electrolyte could freeze in the low temperatures (tantalum capacitors were used instead). The design also includes two processors with inter-processor communication through UART (Universal Asynchronous Receiver/Transmitter). With one processor dedicated to performing navigation calculations (navigation computer 130) and the other dedicated to flight control (flight computer 132), the design avoids potential for catastrophic delay caused by navigation calculations which could cripple the flight control of the aircraft if both tasks were running on the same processor.

Components were placed on a PCB in such a way as to minimize PCB size (and therefore cost), while ensuring sensitive traces remained short and direct (such as those for the crystal oscillator). In addition to this, the IMU was designed to be mounted about 1 cm above the main PCB in order to minimize electrical interference with the IMU's magnetometer. Two of the major components of the flight controller, the GSM Module and Radio Module, were designed as separate boards which mount to the main PCB. This was done to allow flight testing to occur without risk of damaging those (expensive) components and to allow room for error if a problem was found with either of those systems, requiring a new design to be used.

Given the nature of the disclosed system, energy consumption is paramount. In order to minimize energy use, high-efficiency buck converters were used wherever possible for regulating power to the flight controller and modules. Configurations herein employ computing implemented based on a particular onboard computing device. Any suitable computing platform satisfying the weight and power expectations may be employed. In the disclosed configuration, a buck converter is used for voltage control, which is far more efficient than a standard linear regulator because it does not shed excess voltage as heat. The design also includes MOSFETs which behave as switches for shutting off power to the control and release servos during ascent. All told, the system is estimated to use about 650 mAh at 6V over the course of a flight, and with our 4 AA lithium batteries holding 3000 mAh, our system has a large safety buffer for GSM transmissions after landing and for additional losses which weren't accounted for. Oher design and implementation efficiencies may be included in alternate configurations.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A propulsionless flight device, comprising:
    a flight body in the shape of a flying wing and having an aerodynamic response to an airflow generated in response to a free fall, the flying wing having a central body elongated in the direction of travel;
    a plurality of actuators, the actuators operable for directing control surfaces in the airflow on opposed sides of the flight body for effecting airflow above and below the control surfaces;
    wings defined by elongated planar surfaces extending from opposed sides of the flight body, the control surfaces attached to the wings, the wings extending in opposed directions from the sides of the central body, the wings tapering to a narrow width and angled back from the direction of travel, the actuator directed control surfaces coupled on a rearward side of the wing and extending along a length of each wing; and
    navigation logic in a navigation computer determining a distance and a heading to a predetermined landing site, the navigation computer for computing the predetermined landing site by:
        identifying, in a memory, the available landing sites;
        computing, from the available landing sites, attainable landing sites based on an altitude, distance, and altitude layers having high winds;
        computing the predetermined landing site based on which of the attainable landing sites is unlikely to be affected by the high wind layers;
    the actuators responsive to the navigation logic for directing the flight body via the actuators to the predetermined landing site based on airflow resulting from a gliding movement of the flight body for attaining the predetermined landing site in an absence of active propulsion.

2. The device of claim 1 wherein the actuators further comprise a first actuator for controlling a right control surface and a second actuator for controlling a left control surface, the right control surface and left control surface operative to steer the flight body to the predetermined landing site.

3. The device of claim 1 further comprising a flight computer in communication with the navigation computer for receiving a heading and a distance, and directing the actuators to attain the predetermined landing site based on:
    receiving position information from a GPS (Global Positioning System);
    receiving speed information from a pitot tube; and
    receiving angular information from an IMU (Inertial Measurement Unit).

4. The device of claim 1 further comprising a battery connected to the actuators for powering the actuators, the battery having an electrical capacity for powering the actuators to the predetermined landing site and a weight for permitting propulsionless gliding operation of the flight body.

* * * * *